(12) United States Patent
Vernhes et al.

(10) Patent No.: US 11,365,965 B2
(45) Date of Patent: Jun. 21, 2022

(54) TOPOGRAPHIC MEASUREMENT DEVICE

(71) Applicant: INSIDIX, Seyssins (FR)

(72) Inventors: Pierre Vernhes, Saint Martin d'Uriage (FR); Cyrille Jacquet, Gieres (FR); Régis Braisaz, Reaumont (FR); Pierre-Louis Toussaint, Grenoble (FR)

(73) Assignee: INSIDIX, Seyssins (FR)

( * ) Notice: Subject to any disclaimer, the term of this patent is extended or adjusted under 35 U.S.C. 154(b) by 105 days.

(21) Appl. No.: 17/044,012

(22) PCT Filed: Apr. 29, 2019

(86) PCT No.: PCT/FR2019/050999
§ 371 (c)(1),
(2) Date: Sep. 30, 2020

(87) PCT Pub. No.: WO2019/207267
PCT Pub. Date: Oct. 31, 2019

(65) Prior Publication Data
US 2021/0123722 A1 Apr. 29, 2021

(30) Foreign Application Priority Data
Apr. 27, 2018 (FR) ...................................... 1853760

(51) Int. Cl.
*G01B 11/25* (2006.01)
(52) U.S. Cl.
CPC ...... *G01B 11/2504* (2013.01); *G01B 11/2518* (2013.01)
(58) Field of Classification Search
CPC .. G01B 11/25; G01B 11/2504; G01B 11/2518
(Continued)

(56) References Cited

U.S. PATENT DOCUMENTS

| 2003/0025890 A1 | 2/2003 | Nishinaga |
| 2006/0023226 A1 | 2/2006 | Christoph |

(Continued)

FOREIGN PATENT DOCUMENTS

| WO | WO-0243195 A2 * | 5/2002 | ............... A47F 9/04 |
| WO | 2013/175590 A1 | 11/2013 | |
| WO | 2014/023332 A1 | 2/2014 | |

OTHER PUBLICATIONS

Jul. 19, 2019 Search Report issued in International Patent Application No. PCT/FR2019/050999.

*Primary Examiner* — Sunghee Y Gray
(74) *Attorney, Agent, or Firm* — Oliff PLC

(57) ABSTRACT

A device for measuring the surface topography of a sample includes a projector which projects a structured image onto the surface of the sample. A camera observes the image projected onto the surface of the sample. A heating device applies a temperature ramp on the sample. A first optic device located on the optic axis of the projector modifies the image emitted by the projector and applies it on the sample. The first optic device includes several distinct lenses defining different magnifications. The lenses are fitted movable with respect to one another. A second optic device is located on the optic axis of the camera to modify the size of the observation area on the surface of the sample. The second optic device includes several distinct lenses presenting different magnifications. The lenses are fitted movable to define several observation areas of different sizes.

8 Claims, 7 Drawing Sheets

(58) Field of Classification Search
USPC .......................................................... 356/601
See application file for complete search history.

(56) References Cited

U.S. PATENT DOCUMENTS

| | | |
|---|---|---|
| 2008/0055583 A1 | 3/2008 | Lecomte et al. |
| 2014/0043470 A1* | 2/2014 | Winterot .............. G02B 21/025 348/135 |
| 2016/0011123 A1* | 1/2016 | Shibata ................ H04N 5/2256 356/237.5 |

\* cited by examiner

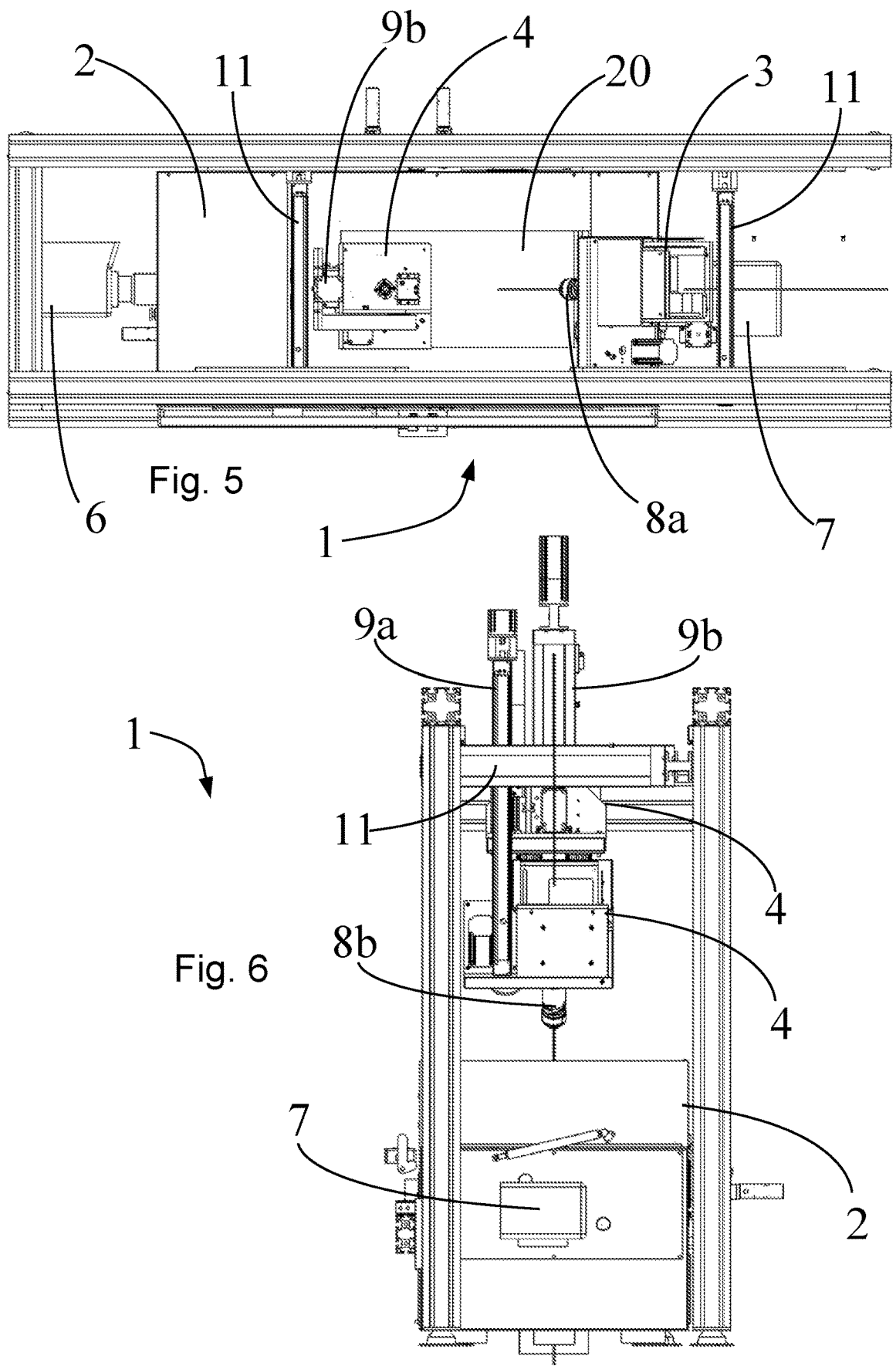

TOPOGRAPHIC MEASUREMENT DEVICE

BACKGROUND OF THE INVENTION

The present invention relates to a device for measuring the surface topography of a sample.

STATE OF THE ART

In order to better detect possible malfunctionings of an electronic circuit and more generally of an electronic system, it is particularly advantageous to analyse and quantify variations of its topography at different temperatures in particular during a temperature ramp. This makes it possible in particular to determine which are the most stressed areas that are liable to be deformed during the numerous temperature changes undergone by an electronic circuit in the course of its manufacture and use.

Surface topography measurement conventionally involves subjecting the electronic system to a temperature profile comprised between −60° C. and 300° C. For example purposes, the temperature variation rate is about ±3° C./s. Surface topography measurement ideally has to be performed in continuous manner, i.e. without waiting for a thermal equilibrium to be established after each temperature variation, so as to reduce the time required for performing the operation and to simulate the temperature profile that is the closest to reality.

In conventional manner, a sample is subjected to a temperature ramp and the modification of its topography is measured regularly over time, i.e. at different temperatures. To quantify the change of topography of the sample as precisely as possible, it is known to run a first temperature ramp in which the whole of the area of interest of the sample is observed so as to gain knowledge of the global behaviour of the area of interest.

During the temperature ramp, a projector emits a sequence of patterns which are projected onto the sample to be measured. A camera acquires an image of each pattern which is deformed on the surface of the part to be measured. An image processing algorithm calculates the altitude corresponding to the portion of the sample being observed by the camera. Analysis is performed pixel by pixel. A surface topography of the sample that is being measured can then be obtained.

Depending on the size of the part to be observed, it is known to adjust the type of camera and the projector optics so that the latter projects an image covering the whole of the area to be measured. The intersection of the observation cone by the camera and of the illumination cone from the projector makes it possible to determine a volume in space. This volume corresponds to the maximum measurable volume. In practice, this maximum volume is much smaller as it is also necessary for the image supplied by the projector and the image recovered by the camera to be clear. It is also necessary for the image processing algorithm to be able to recognize the optic geometry and parameters used. It is therefore particularly important to calibrate the optic characteristics of the projector correctly with those of the camera.

To perform successive measurements with different resolutions along the Z axis, the measuring device has to be partially dismantled in order to modify the camera optics and the projector optics. This modification of the measuring device for example enables the surface of the analysis area to be reduced to a portion of the sample and increases the measurement resolution. The sample is placed back in the measuring device before or after calibration of the new optics with respect to the plate supporting the sample.

The sample is again subjected to the temperature ramp and a portion of the area of interest is analysed. These operations are repeated each time the measurement resolution has be to changed which means that the camera optics and those of the projector have to be changed.

This results in measurement of the different configurations required to reasonably quantify a sample being relatively long. Furthermore, the sample is subjected to several temperature ramps which may distort comparison of the successive results.

OBJECT OF THE INVENTION

One object of the invention consists in remedying these shortcomings and in providing a topographic measuring device enabling different resolutions to be measured along the Z axis more quickly.

This object tends to be achieved by means of a device for measuring the surface topography of a sample comprising:
  at least one projector configured to emit a patterned light designed to be projected onto the surface of the sample,
  at least one camera configured to observe said patterned light projected onto the surface of the sample,
  a heating or cooling device configured to apply a temperature ramp to the sample in the enclosure.

The measuring device is remarkable in that it comprises:
  a first optic device located on the optic axis of the projector between the projector and the sample, the first optic device presenting several different magnifications by means of several distinct first lenses, the first lenses being mounted movable with respect to one another so as to provide different resolutions of the patterned light,
  a second optic device located on the optic axis of the camera between the camera and the sample, the second optic device presenting several different magnifications by means of several distinct second lenses, the second lenses being mounted movable with respect to one another so as to provide different resolutions of the camera.

According to one development, the measuring device comprises an enclosure designed to receive the sample. The heating or cooling device is configured to adjust the temperature inside the enclosure. The projector, camera and first and second optic devices are located outside the enclosure.

In a particular embodiment:
  the first optic device comprises a motor configured to modify the active lens among the first lenses,
  the second optic device comprises a motor configured to modify the active lens among the second lenses,
  a control circuit connected to the first optic device and to the second optic device and configured to change the active lens among the first lenses and to change the active lens among the second lenses in response to a user instruction, the control circuit being configured to modify the magnifications of the first and second active lenses in the same manner.

Preferentially, the first optic device comprises a plurality of first lenses presenting different focal distances from one another. The measuring device comprises means for moving the first optic device along the optic axis of the projector with a plurality of different predefined positions. The control circuit is configured to arrange the first optic device at a predefined position so that a focal point of the active lens of the first lenses is located on the surface of the sample.

In an advantageous embodiment, the second optic device comprises a plurality of second lenses configured to present different focal distances from one another. The measuring device comprises means for moving the second optic device along the optic axis of the camera with a plurality of different predefined positions. The control circuit is configured to arrange the second optic device at a predefined position so that a focal point of the active lens of the second lenses is located on the surface of the sample.

In another development, the camera, the projector, the first optic device and the second optic device are mounted on a displacer configured to simultaneously move the first optic device with the projector and/or the second optic device with the camera in one direction or two distinct directions parallel to the surface of the sample.

It is further advantageous to provide a measuring device that comprises a blower configured to apply a gas flow on the outer surface of a transparent wall of the enclosure, the optic axis of the projector and the optic axis of the camera passing through the transparent wall.

It is a further object of the invention to provide a measuring method that is quicker than the methods of the prior art as it enables measurements to be made with different resolutions along the Z axis during a temperature ramp.

The method for measuring a sample is remarkable in that it comprises:
providing a sample,
applying a first temperature ramp to the sample, the sample having a temperature that progresses from a first temperature to a second temperature different from the first temperature,
projecting a patterned light onto the surface of the sample by means of a projector and a first optic device applying at least a first magnification,
observing said patterned light projected onto the surface of the sample by means of a camera and a second optic device applying at least a second magnification.

Advantageously, during the temperature ramp, the first optic device modifies the value of the first magnification and the second optic device modifies the value of the second magnification to modify the size of the field of view and the resolution perpendicularly to the surface of the sample.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF A PREFERRED EMBODIMENT OF THE INVENTION

Figure 1:
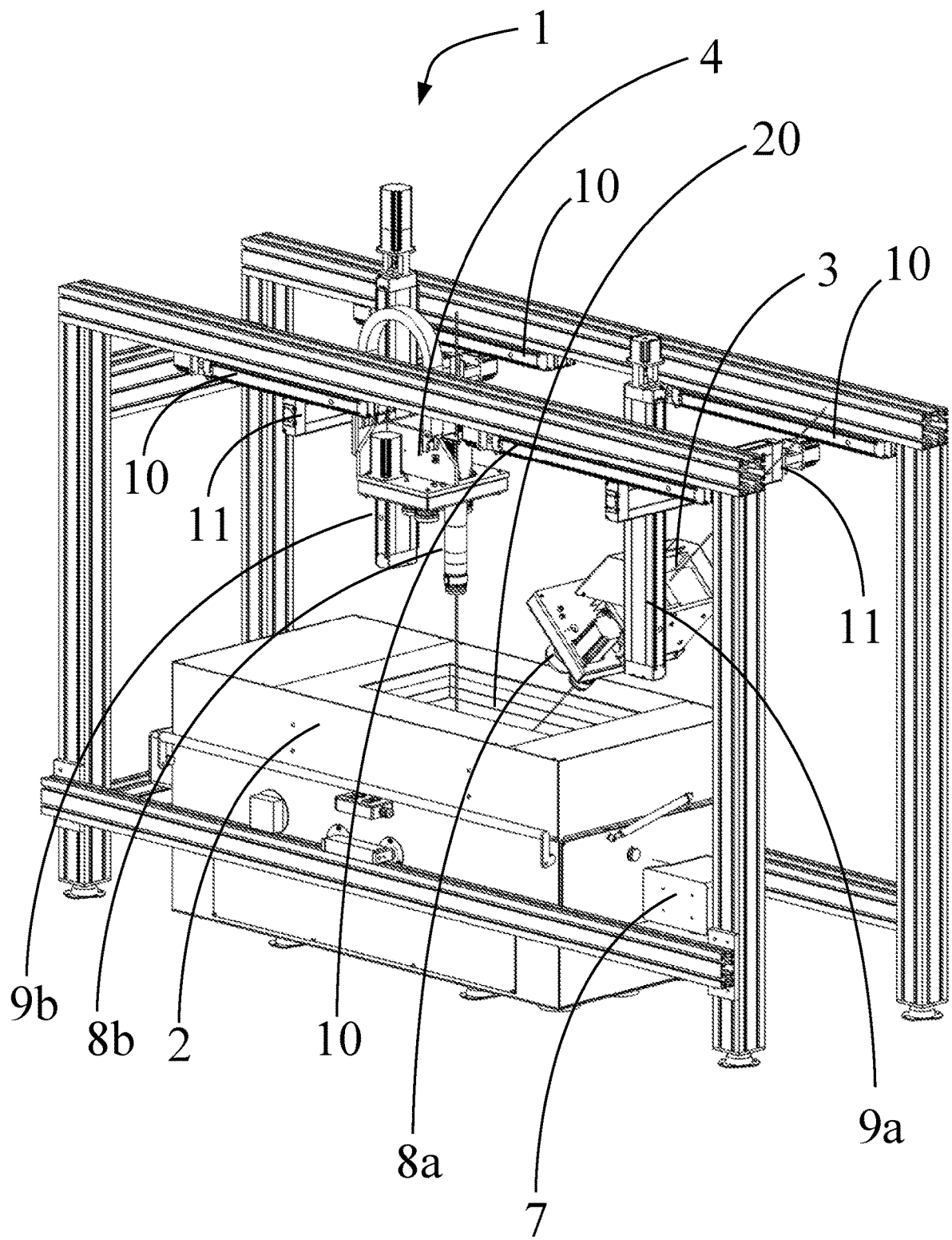
FIGS. 1 and 2 schematically represent two perspective views of an embodiment of a measuring device according to the invention, FIG. 3 schematically represents a side view of a measuring device according to the invention, FIG. 4 schematically represents a front view of a measuring device according to the invention, FIG. 5 schematically represents a top view of a measuring device according to the invention, FIG. 6 schematically represents a back view of a measuring device according to the invention, FIG. 7 schematically represents a side view of another embodiment of a measuring device according to the invention, FIG. 8 schematically represents a perspective view of an embodiment of a measuring device according to the invention.
Figure 2:
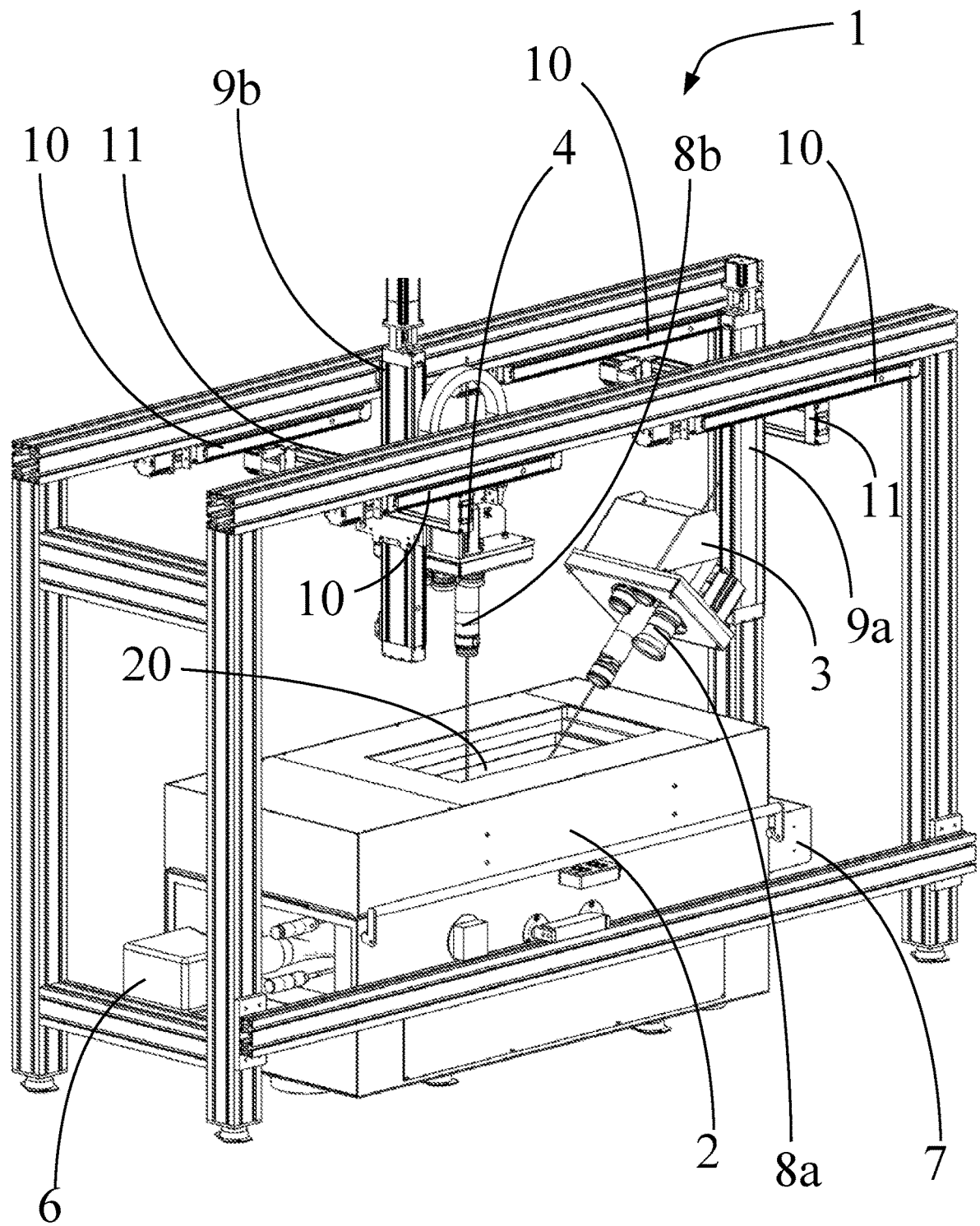
Figure 3:
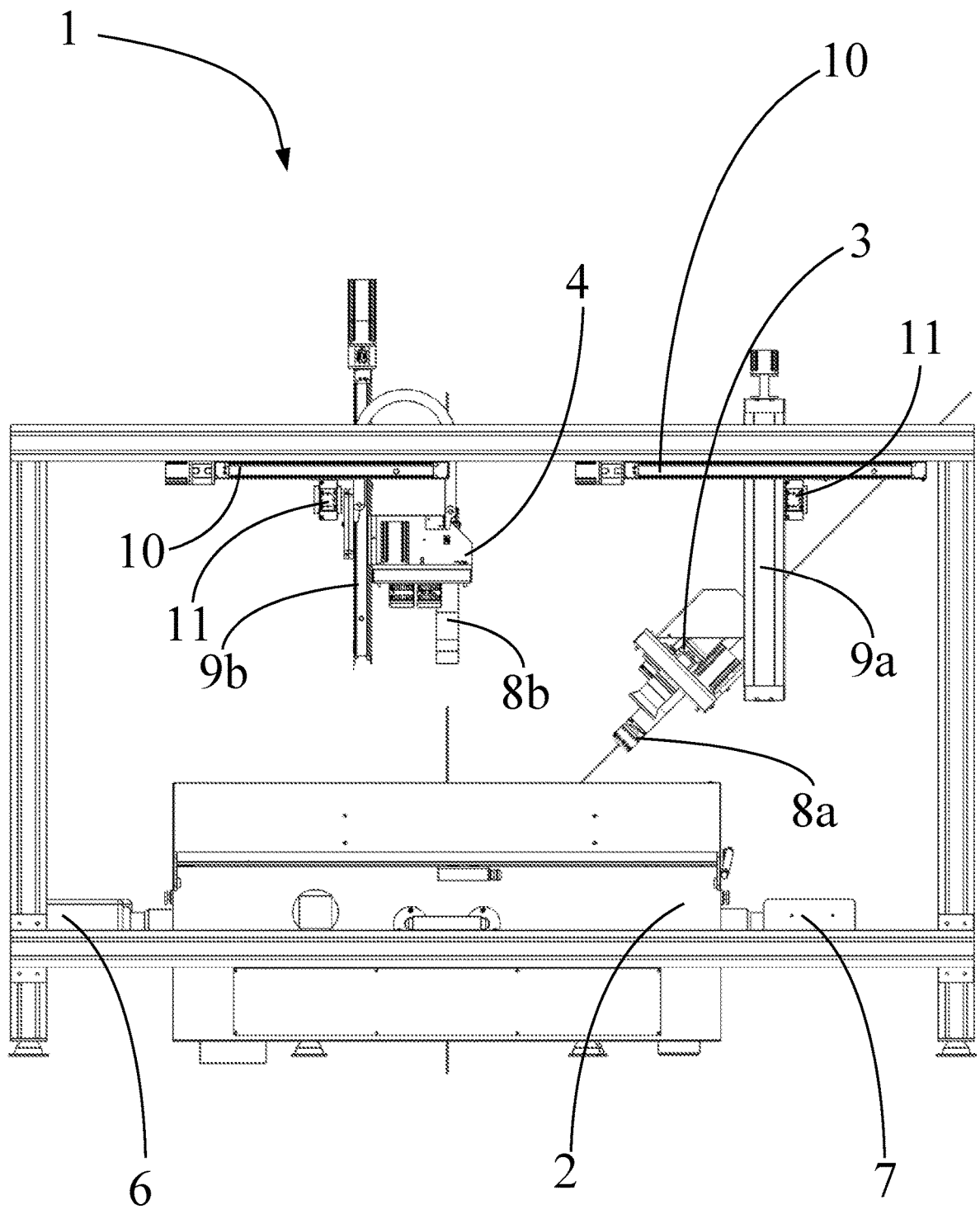
Figure 4:
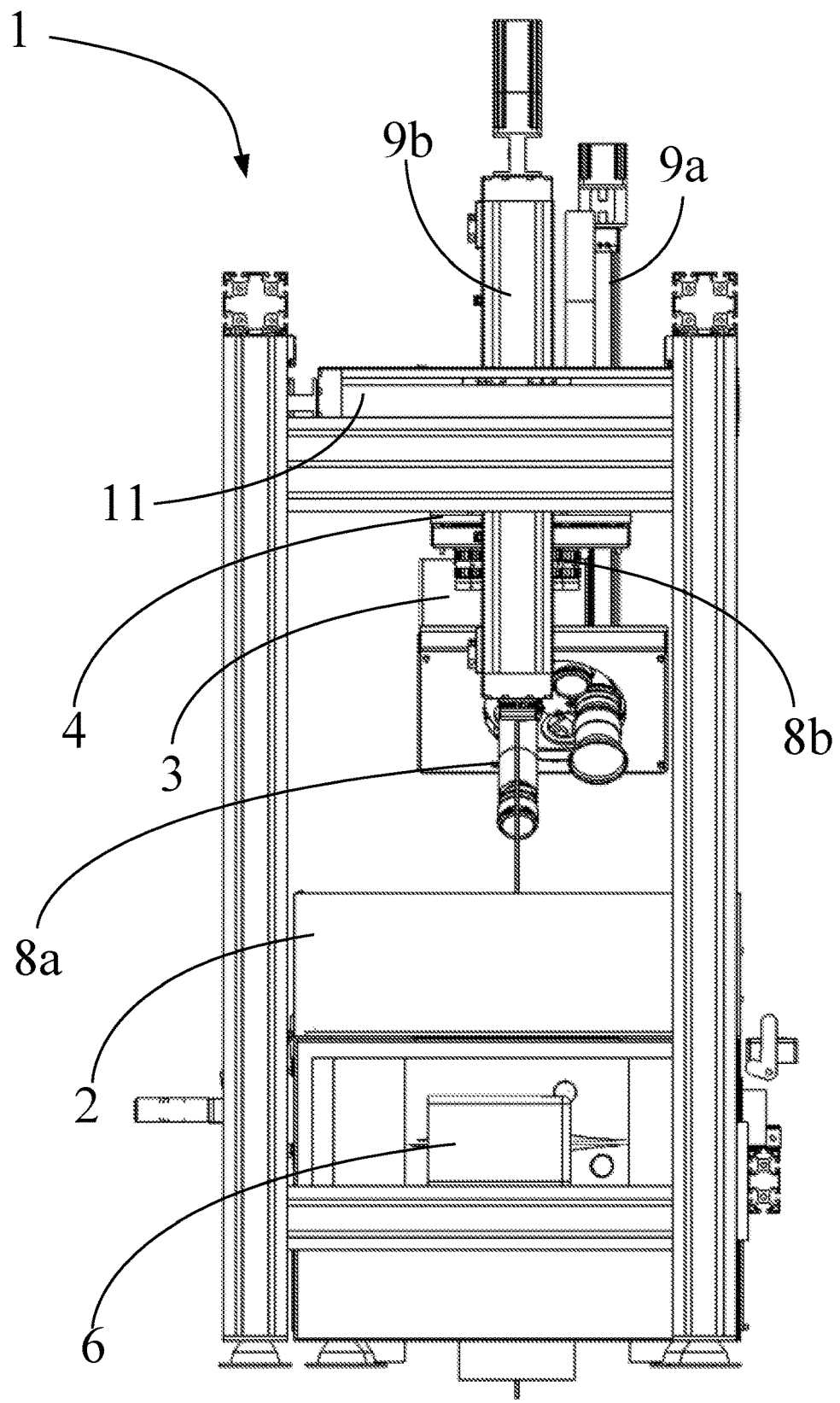

The measuring device is a device for measuring the surface topography of a system also called sample.

Such a measuring device is mainly used to study the reliability and failure modes of the system. What is meant by "surface" is the outer part of the system that circumscribes the volume occupied by the latter. The surface can therefore be 3-dimensional. We are therefore not restricted to the mathematical definition of "surface" which is a 2-dimensional entity.

The system can belong to different technical fields. For non-restrictive example purposes, the following can be cited—electronics, in particular microelectronics, the automobile industry, aerospace, or the medical sector. In the microelectronics field, the system can for example be a semiconducting wafer, a connector, a socket, a printed circuit, a die, a Ball Grid Array (BGA), or a Package on Package (PoP).

Device 1 illustrated in FIGS. 1 to 8 is a device 1 for measuring the surface topography of a sample (not shown), device 1 comprising:
an enclosure 2 designed to accommodate the system, enclosure 2 comprising a transparent part 20 in the visible range,
heating means arranged in and/or outside enclosure 2 to heat the sample,
projection means arranged outside enclosure 2 to project a patterned light in the visible range onto the surface of the system and through transparent part 20 of enclosure 2, the projection means comprising at least one projector 3,
image capture means arranged outside enclosure 2 to capture the patterned light reflected by the surface of the system propagating through transparent part 20 of enclosure 2. The image capture means comprise at least one camera 4.

Enclosure 2 of device 1 comprises at least one inner wall separating the inside of the enclosure comprising the sample and the outside of the enclosure where the projection means and image capture means are installed.

Transparent part 20 of enclosure 2 advantageously comprises:
a first glazed surface through which the patterned light is projected,
a second glazed surface through which the patterned light reflected by the surface of the system is propagated.

The projection means advantageously comprise a projector 3 located outside enclosure 2 to project the patterned light in the visible field onto the surface of the system and through transparent part 20 of enclosure 2, more precisely through the first glazed surface of enclosure 2.

The patterned light advantageously forms a moiré fringe pattern. In one embodiment, the projector directly emits a moiré fringe pattern. In an alternative embodiment, the patterned light is formed by means of a mask through which the light originating from the projector passes. The mask comprises openings and opaque regions, for example in the form of a Ronchi grating. It is also possible to combine these two techniques.

The image capture means advantageously comprise a camera 4 arranged outside enclosure 2 to capture the patterned light reflected by the surface of the system propagating through transparent part 20 of enclosure 2, more precisely through the second glazed surface of enclosure 2. Camera 4 is designed to provide the measurements of the surface topography of the system from the captured patterned light.

Device 1 advantageously comprises heating and/or cooling means which are configured to make the temperature of the sample change from a first temperature to a second temperature different from the first temperature. The heating and/or cooling means are configured to apply at least one temperature ramp to the sample. When a heating step is performed, the first temperature is lower than the second temperature. When a cooling step is performed, the first temperature is higher than the second temperature.

It is also possible to provide for the heating and/or cooling means to comprise injection means arranged to inject a fluid into enclosure 2. The fluid can be heated prior to being injected in enclosure 2 in order to heat the sample. It is also possible to cool the fluid before it is injected in enclosure 2 in order to cool the sample.

To cool the sample, the fluid is advantageously air or liquid nitrogen. The fluid is advantageously at ambient temperature, for example between 20° C. and 30° C., or refrigerated for example at a temperature lower than −80° C. To heat the sample, the fluid is advantageously air or a neutral gas such as nitrogen or argon.

The measuring device can comprise expulsion means arranged to expel a fluid from enclosure 2.

The injection means advantageously comprise:
fans 6 and 7 arranged to inject air at ambient temperature into enclosure 2,
fluid distributors arranged to distribute the air injected by fans 6 and 7 inside enclosure 2.

Several series of apertures are advantageously arranged in the fluid distributors for the purposes of directing the air from fans 6 in different directions so as to homogenise the heating and cooling inside enclosure 2.

The temperature variation rate for cooling can be about −3° C./s for temperatures of more than 120° C. The expulsion means advantageously comprise a main duct comprising two secondary ducts. Each secondary duct presents a first end opening into the main duct and a second end opening into a hood present in enclosure 2.

The heating means are advantageously infrared heating means. The infrared heating means advantageously comprise infrared lamps. The infrared heating means are arranged inside enclosure 2 so as to improve the thermal homogeneity in enclosure 2. More precisely, the infrared lamps are designed to be arranged underneath the system. The infrared heating means advantageously comprise infrared lamps fitted on the hood. The infrared lamps are designed to be arranged above the system. The infrared heating means are advantageously designed to heat the system to a temperature of 400° C. The injection means and expulsion means are advantageously designed to cool the system to a temperature of −60° C.

It is apparent that such a measuring device is particularly practical for measuring the deformation of a sample. However, by definition, a sample is not isotropic and its behaviour changes depending on the different locations so that it is particularly interesting to ascertain and quantify the change of deformation of the sample as a whole as well as the progression of the sample in one or more precise areas, preferably with different resolutions along the Z axis.

It is therefore particularly advantageous to be able to measure different surfaces of the sample in order to be able to distinguish between the modification of the topography for a whole system and the modification of the topography for a more specific area. It is then possible to identify that a specific area has a different behaviour from the rest of the system and to identify a possible preferential failure area.

For a sensor formed by pair comprising a camera 4 and projector 3, the resolution along the X and Y axes depends on the magnification defined by the camera optics and to a lesser extent on the magnification defined by the optics of projector 3. It is also apparent that the resolution along the Z axis depends mainly on the magnification of the optics associated with projector 3.

The inventors observed that the magnification of the optics associated with projector 3 makes it possible to determine the fineness of the projected patterns and therefore to define the resolution along the Z axis. It is apparent that the resolution of camera 4 depends on the measurement field, i.e. on the surface observed by camera 4 and the surface illuminated by projector 3. The Z axis corresponds to the perpendicular to the surface of the sample holder which corresponds to the optic axis of the camera or substantially to the optic axis of camera 4.

In order to improve the ergonomics of measuring device 1, the inventors propose to provide a measuring device having several different measurement fields in order to define configurations proposing different resolutions along the Z axis.

Camera 4 has a resolution defined by its sensor which transforms light information into electric information. By judiciously choosing the optics placed between the sample and sensor, it is possible to define the analysis area and the quantity of information to be processed on output from the camera to quantify this analysis area.

It is also judicious to adjust the optics located between the patterned light projector and the sample so as to adjust the distance between fringes and the thickness of the fringes to define the maximum resolution along the Z axis authorised by projector 3.

In order to facilitate analysis of a sample, it is particularly advantageous to adjust the resolution of the fringe pattern present in the patterned light to match the resolution of the camera.

The inventors propose to use a first optic device arranged on the optic axis of projector 3 so as to modify the image emitted by projector 3 and to apply this image on the surface of the sample to be tested. The first optic device comprises a plurality of distinct first lenses. The multiple first lenses present different magnifications thereby enabling the image to be observed and analysed to be projected onto a more or less large portion of the sample with different fringe characteristics. In this way, by modifying the active lens of the set of first lenses, it is possible to illuminate the whole sample or only a more or less large part of the sample.

When projector 3 emits the patterned light directly, the modification of the magnification applied by the first optic device modifies the characteristics of the patterned light pattern, i.e. the repetition pitch between fringes and the width of the fringes. Modification of the magnification enables only the resolution of the patterned light to be modified without having to modify projector 3, which makes for ease of manufacture and use of the projector. This configuration makes it possible to have a more stable projector and to increase the reproducibility of the measurements as the characteristics of the patterned light on immediate output from projector 3 do not change.

The measuring device advantageously comprises a second optic device arranged on the optic axis of camera 4 so as to modify the size of the area observed by the camera on the surface of the sample to be tested. The second optic device comprises a plurality of distinct second lenses which present different magnifications.

Adjustment of the magnification applied by the second optic device enables the resolution of camera 4 to be modified so as to match the resolution of the patterned light.

In this way, by modifying the set of second lenses, it is possible to observe the whole sample or only a part of the sample. It is particularly advantageous to adjust the size of the observed area to match the size of the image that is projected onto the sample. It is indeed very difficult to recover usable data if camera 4 is configured to observe an area not containing the image projected by projector 3. This requires additional image processing work. It is therefore particularly advantageous to analyse a complete image instead of a portion of image.

The first optic device and second optic device each have sets of lenses that are configured to be movable with respect to one another and that are each actuated by a motor so that switching from one first or second lens to another is automated and indexed. It is then possible to change the magnification applied by projector 3 and the magnification applied by camera 4 quickly without having to open the measuring device and modify the heat flows on the outer wall of enclosure 2, which may modify the temperature of enclosure 2 thereby modifying the temperature ramp applied on the sample or on a part of the sample.

This configuration also avoids having to place the enclosure in a temperature range that is compatible with handling of the optics by an operator. For example, if the temperature of the enclosure is more than 60° C., risks of burns have to be taken into account and the operator has to be specially equipped which makes dismantling and fitting of new optics more complicated. It is then difficult to change the optics quickly. The problem is identical when the enclosure is subjected to low temperatures.

By using different sets of lenses which are already installed in measuring device 1 and are configured to be installed along the optic axis of camera 4 and/or of projector 3, precious time can be saved by simply replacing one first or second lens by another.

In particularly advantageous manner, the sets of lenses are configured to move in translation or in rotation in a plane perpendicular to the optic axis of camera 4 and/or of projector 3. This configuration enables quick and easy installation of a set of lenses. This applies both for the first optic device and for the second optic device.

In a particular embodiment, the first optic device comprises a turret 8a configured to comprise several different first lenses. In another particular embodiment, the second optic device comprises a turret 8b configured to comprise several different second lenses. This embodiment is particularly easy to achieve and enables easy indexing of the different sets of lenses.

It is also advantageous to provide for the use of a control circuit that is configured to change the active lens of the set of first lenses of the first optic device in response to a user command. The control circuit is also configured to change the active lens of the set of second lenses of the second optic device when the first optic device changes its magnification.

The control circuit is connected to the first optic device and to the second optic device in order to engage a change of magnification in response to a user action. The control circuit has a user control located outside the enclosure and outside the movement space of camera 4 and projector 3.

In advantageous manner, the measuring device defines a closed volume inside which enclosure 2, projector 3 and camera 4 are located. The first and second lenses move in this closed volume. The user control is located outside this closed volume.

In this way, a single user action enables matching of the resolution of the patterned light applied by projector 3 and the resolution of camera 4 designed to observe the patterned light. As the pairs of sets of lenses are recorded in the control circuit, the optic performance of camera 4 is automatically adjusted to match the optic performance of projector 3 thereby preventing risks of error. In one embodiment, the control circuit is designed to define a particular pair of one lens from the set of first lenses and one lens from the set of second lenses. In this way, the user chooses an analysis surface and/or a resolution along the Z axis and the control circuit defines which pair of first and second lenses is to be used.

As the positions of the different lenses are recorded and indexed, switching from one set of lenses to another is quicker making it easier to perform several measurements with different magnifications during a single temperature ramp which is impossible with devices of the prior art. The measurements can be made by means of a computer.

In a particular configuration, the first optic device comprises a plurality of first lenses presenting different focal distances from one another. Measuring device 1 comprises a first displacement means 9a which is configured to move the first optic device along the optic axis of projector 3 with a plurality of predefined positions. The control circuit is configured to place the first optic device in a predefined position such that a focal point of the first set of lenses is located on the surface of the sample. In other words, the position in space of projector 3 associated with the first optic device with respect to the sample supported by the sample holder is pre-recorded for each of the first lenses. When the control circuit modifies the first active lens, it also modifies its position in the measuring device at a pre-recorded location. The position is recorded beforehand for each first lens according to its optic characteristics.

In particularly advantageous manner, displacement means 9a of the first optic device is also configured to move projector 3 so that the distance between projector 3 and the first optic device is substantially constant for all the first lenses. With such a configuration, it is easier to place the first lenses of the optic device in their optimum position along the optic axis. First displacement means 9a is motor-driven and the position of the first optic device with respect to the surface of the sample or with respect to the surface of the sample holder is recorded in the control circuit. In this way, when the choice of a first lens is made, the control circuit also defines its distance with respect to the sample along the optic axis of projector 3.

The same is advantageously the case for camera 4 and the second optic device which are associated with a second displacement means 9b. Second displacement means 9b is motor-driven and the position of the second optic device with respect to the surface of the sample or with respect to the surface of the sample holder is recorded in the control circuit. In other words, the position in space of camera 4 associated with the second optic device with respect to the sample supported by the sample holder is pre-recorded for each of the second lenses. When control circuit modifies the second active lens, it also modifies its position in the measuring device at a pre-recorded location. The position is recorded beforehand for each second lens according to its optic characteristics.

In this way, when the user decides to modify the resolution of measurement along the Z axis, the control circuit modifies the first and second optic devices and it also modifies their positions in space within the measuring device.

Indexing of the positions of the first and second optic devices and therefore of the projector and camera enables the inner volume of the measuring device to be adjusted thereby reducing its space occupation.

The positions in space of the first optic device and of the second optic device are pre-recorded in the control circuit according to the set of first lenses being used and to the set of second lenses being used. The image representative of the patterned light is thus automatically clear at the surface of the sample and camera 4 also recovers a clear image at the surface of the sample. Measurement of the surface topography can be performed more quickly as it is no longer necessary to perform the focusing steps after each change of magnification.

The different first and second lenses are installed on the measuring device before the temperature ramp is applied which enables the position of the different pairs of first and second lenses to be calibrated thereby enabling the optimum positions of the lenses to be recorded so as to quickly perform a quality measurement.

It is particularly advantageous to use a plurality of fixed-focal-length optics as these optics are simple to use and provide a gain in compactness. This configuration also avoids using a system equipped with zooms which imposes numerous technical trade-offs with in particular a limitation of the field depth and/or of the accessible magnifications.

With such a configuration, it is possible during a temperature increase or a temperature decrease phase to perform several acquisitions using several sets of different first and second lenses in order to acquire several measurements with different resolutions along the Z axis. In other words, during a temperature increase/decrease phase, the first optic device can successively use several different first lenses to apply several magnifications in consecutive manner in time. When the temperature ramp is performed, the projector emits a sequence of patterns which are projected onto the sample to be measured. The camera acquires an image of each pattern which is deformed on the surface of the part to be measured. An image processing algorithm calculates the altitude corresponding to the portion of the sample observed by the camera. Analysis is performed pixel by pixel. It is then possible to obtain a surface topography of the sample being measured.

Different characteristics of the sample can then be measured during one and the same temperature increase or decrease phase. This configuration is particularly advantageous when the sample becomes progressively degraded as the temperature changes so that the measurement made on a sample during a first temperature ramp is slightly different from the measurement of the same sample under the same conditions during the next temperature ramp.

In order to have a measuring device 1 having a very good thermal agility, i.e. it is able to heat and/or cool a sample quickly and can therefore follow a complex temperature profile in time, it is preferable to limit the volume of enclosure 2 containing the sample as far as possible. It is therefore particularly advantageous to locate camera 4 and projector 3 outside the enclosure.

To obtain a good thermal agility, it is also preferable to limit the number of components located in the enclosure as far as possible thereby limiting the thermal mass of enclosure 2. It is also advantageous to limit the functionalities of the sample holder located in the enclosure in order to reduce its mass. In advantageous manner, the sample holder is devoid of displacement means along the X and Y axes which are two perpendicular axes contained in the same plane parallel to the top surface of the sample holder and advantageously horizontal.

It is also advantageous to provide for the sample holder not to have displacement means along the Z access to limit the thermal mass of the sample holder.

It is also advantageous to avoid movement of the sample holder during a thermal cycle, for example during a temperature increase or decrease phase, as this results in destabilisation of the sample. Movement of the sample holder can cause a change of bearing and position of the sample during a thermal cycle. This modification of the position of the sample considerably complicates processing of the data collected by the camera and may even make processing impossible, in particular comparison of the topographies at different temperatures. It is also apparent that displacement of the sample may cause a modification of the thermal coupling with the heating and cooling means resulting in a difficulty to compare the differences of topography.

This configuration is preferable to a solution where the sample holder can move along the Z axis to match up with the focal distance of the lens used in association with projector 3 and/or with camera 4. This solution also provides a greater freedom in the choice of lenses that can be used to form the first optic device and second optic device by allowing independent movement of the two optic devices with respect to one another.

To facilitate measurement of several different areas of the sample, it is proposed to mount camera 4, projector 3, the first optic device and the second optic device in movable manner with respect to enclosure 2, to the sample holder and therefore to the sample, i.e. movable inside measuring device 2.

This configuration is particularly advantageous as it enables measurements of the changes of the surface topography of the sample to be made in different areas of the sample by moving camera 4 and projector 3 without having to move the sample.

Device 1 advantageously comprises a displacer which can be formed by a controller configured to move projector 3, camera 4, the first displacement device and the second displacement device in at least a first direction and preferentially in secant first and second directions and even more preferentially perpendicular directions. It is advantageous to provide a common displacement of projector 3 with the first optic device and/or a common displacement of the camera with displacement of the second optic device. The displacer is configured to perform displacement of the components in the X and/or Y directions in order to be able to observe the different portions of the sample with the chosen resolution along the Z axis. In advantageous manner, a displacement of the camera along the X or Y axis results in an identical and synchronous displacement of the projector and vice versa.

In the particular embodiment illustrated in FIGS. 1, 2, 3, 4, 5 and 6, it is possible to observe that the displacer is configured to displace projector 3, camera 4, first optic device 8a and second optic device 8b only in the X and Y directions by means of two slides respectively oriented in the X and Y directions. Measuring device 1 can also comprise slides oriented in the Z direction so that the focal point of the first optic device or of the second optic device is located on the surface of the sample. The displacement space allowed for the projector and camera is defined by the support structure which comprises the slides and which is configured to be closed off by a plurality of covers.

In a particular embodiment, the controller is configured to move the first displacement device and the second displacement device in a plane parallel to the plane of the sample holder supporting the sample. In a preferential embodiment, the controller is configured to move the first displacement device and the second displacement device in a horizontal plane.

The controller advantageously comprises guide means comprising two first slides 10 arranged in the top part of the measuring device on each side of the enclosure. First slides 10 extend in a first direction Y'-Y. The first slides are associated with second slides 11 extending in a second direction X'-X.

Figure 7:
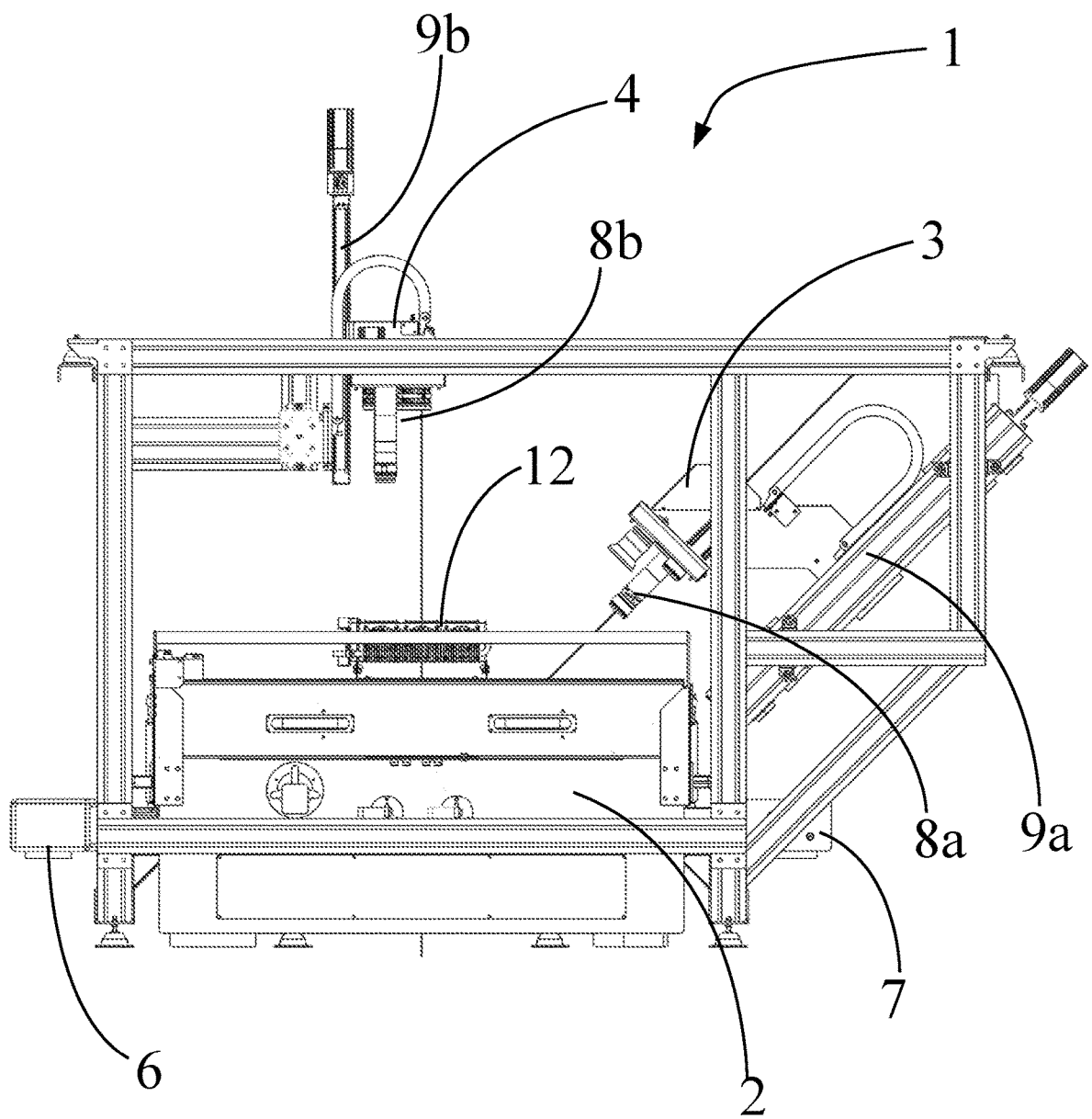
Figure 8:
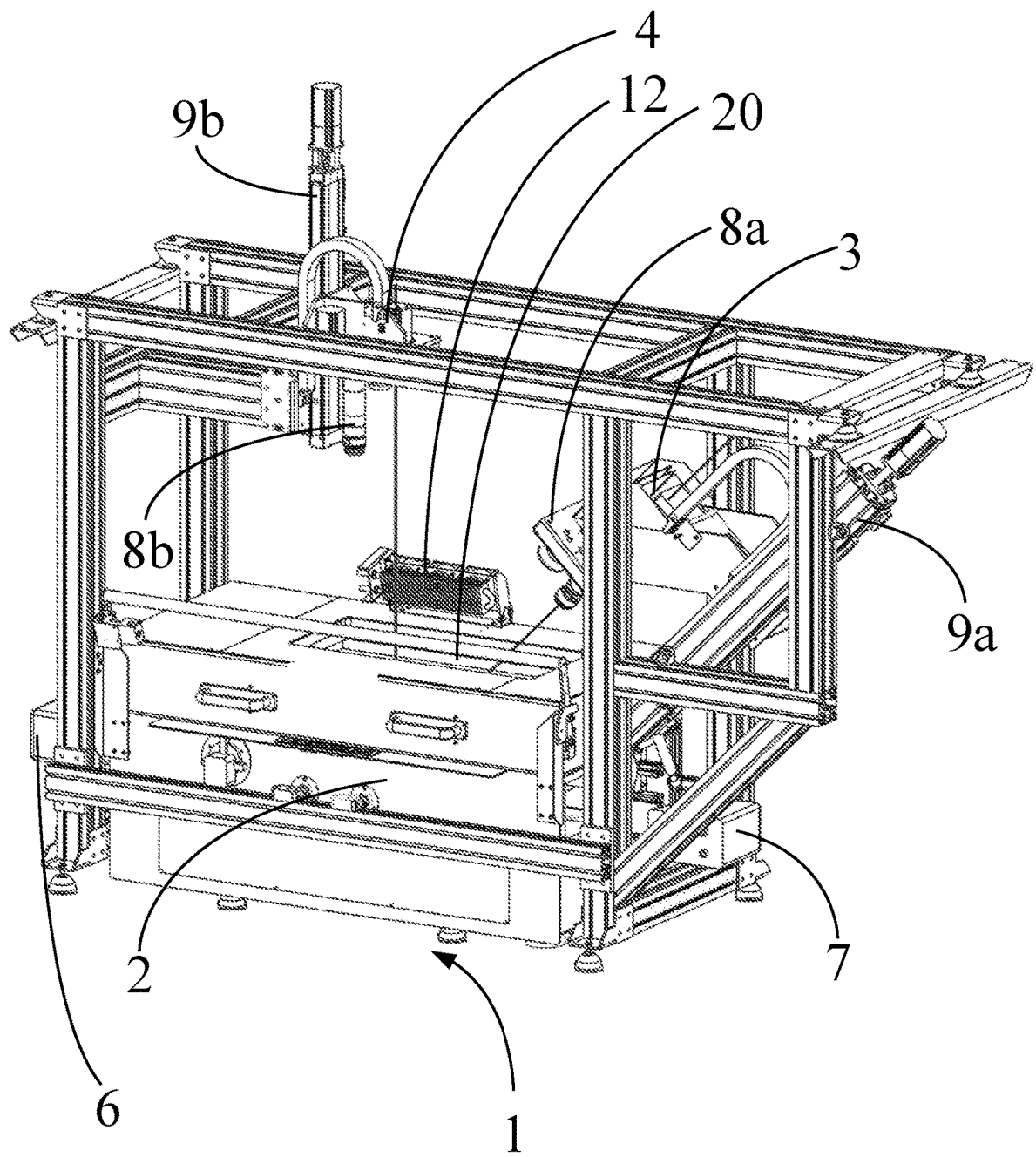

In an advantageous embodiment illustrated in FIGS. 7 and 8, a blower 12 is fitted facing transparent wall 20. The blower is advantageously mounted on enclosure 2.

Blower 12 is mounted so as to project a gas flow onto the outer surface of the transparent wall. The inventors observed that when enclosure 2 is at high temperature, the transparent wall heats the air in the measuring device and generates random movements of the air. These random movements cause flows of hot air and of colder air on the surface of the transparent wall resulting in a random modification of the refractive index of the air in the optic path of projector 3 and of camera 4. Blower 12 enables the air situated in the optic path of camera 4 and of projector 3 to be homogenised so as to reduce disturbances. In advantageous manner, blower 12 is not configured to transform the transparent wall which is a "hot" wall into a "cold" wall, i.e. at ambient temperature for example between 20° C. and 30° C. For example, when the heating device heats the sample, the temperature of the transparent wall is higher than 60° C. when the blower is in operation. The transparent wall does not need to be cooled as the measuring device is advantageously closed off by the covers and/or generation of a cold point at the surface of the enclosure generates thermomechanical stresses with the rest of the enclosure that is not cooled.

The inventors observed that this random modification of the refractive index disturbs the structured image emitted by the projector before the sample is reached and also disturbs the image captured by camera 4. These disturbances impair the quality of measurement.

Another solution is to use an enclosure with a cold outer wall, mainly as far as transparent wall 2 is concerned, but this represents a solution that is technologically more complex and costly.

It is also advantageous to couple the blower with a heating device, for example a heater which can be in the form of a resistance. This configuration enables hot air to be projected to the transparent wall thereby preventing formation of a thin layer of frost which may be deposited on the surface of the transparent wall when the enclosure is working at low temperature.

The latter two technological solutions can be applied to a measuring device with fixed or movable optics as well as to movable or fixed sample holders, and can furthermore be applied to measuring devices in which the camera and projector are fixed or movable.

The invention claimed is:

1. A measuring device of a surface topography of a sample comprising:
    at least one projector configured to emit a patterned light designed to be projected onto the surface of the sample,
    at least one camera configured to observe said patterned light projected onto the surface of the sample,
    an enclosure designed to receive the sample,
    a heating or cooling device configured to apply a temperature ramp to the sample in the enclosure,
       the optic device located on the optic axis of the projector between the projector and the sample, the first optic device presenting several different magnifications by means of several distinct first lenses having different magnifications, the first lenses being mounted movable so as to provide different resolutions of the patterned light, a first motor moving the first lenses in a plane perpendicular to the first optic axis of the projector to define a first active lens located on the optic axis of the projector among the first lenses,
    a second optic device located on a second optic axis of the camera between the camera and the sample, the second optic device presenting several different magnifications by means of several distinct second lenses, the second lenses being mounted movable so as to provide different resolutions of the camera, a second motor moving the second lenses in a plane perpendicular to the second optic axis of the camera to define a second active lens located on the optic axis of the camera among the second lenses,
    a control circuit connected to the first optic device and to the second optic device and configured to change a first active lens among the first lenses and to change a second active lens among the second lenses in response to a user instruction, the control circuit being configured to modify the magnifications of the first and second active lenses in the same manner.

2. The measuring device according to claim 1, wherein the heating or cooling device is configured to adjust the temperature inside the enclosure, measuring device wherein the projector, camera and first and second optic devices are arranged outside the enclosure.

3. The measuring device according to claim 1, wherein the measuring device comprises a displacement-means of the first optic device along the first optic axis of the projector with a plurality of different predefined positions, the control circuit being configured to locate the first optic device in a predefined position such that a focal point of the first active lens of the first lenses is located on the surface of the sample.

4. The measuring device according to claim 1, wherein the measuring device comprises a displacement means of the second optic device along the second optic axis of the camera with a plurality of different predefined positions; the control circuit being configured to locate the second optic device in a predefined position such that a focal point of the second active lens of the second lenses is located on the surface of the sample.

5. The measuring device according to claim 1, wherein the camera, projector, first optic device and second optic device are mounted on a displacer configured to simultaneously displace the first optic device with the projector and/or the second optic device with the camera in one direction or two distinct directions parallel to the surface of the sample.

6. The measuring device according to claim 1, comprising a blower configured to apply a gas flow on the outer surface of a transparent wall of the enclosure, the first optic axis of the projector and the second optic axis of the camera passing through the transparent wall.

7. A method for measuring a sample comprising:
    providing a sample and a measuring device according to claim 1, applying a first temperature ramp to the sample, the sample having a temperature that changes from a first temperature to a second temperature different from the first temperature, projecting a patterned light onto the surface of the sample by means of a projector and a first optic device applying at least a first magnification, observing said patterned light projected onto the surface of the sample by means of a camera and a second optic device applying at least a second magnification, method wherein, during the temperature ramp, the first optic device modifies the value of the first magnification and the second optic device modifies the value of the second magnification to modify the size of the field of view and the resolution perpendicularly to the surface of the sample.

8. The method for measuring according to claim 7, wherein the modification of the magnification on the first optic device and the second optic device is performed during the first temperature ramp at a temperature of more than 60° C.

\* \* \* \* \*